No. 817,300. PATENTED APR. 10, 1906.
O. E. DAVID.
PIPE COUPLING.
APPLICATION FILED APR. 26, 1905.
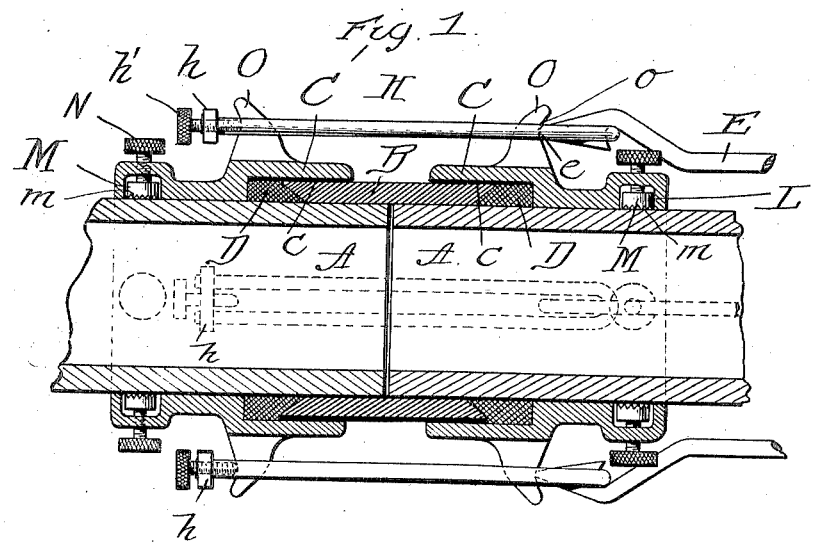
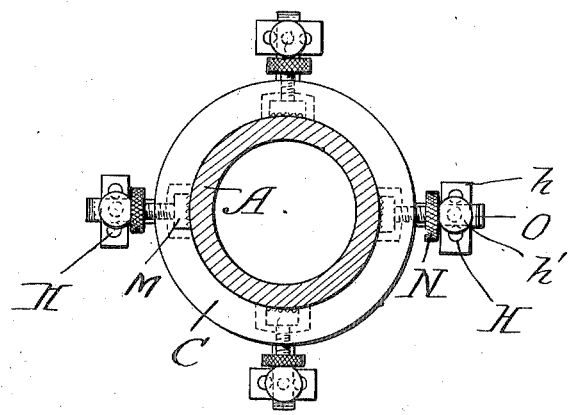
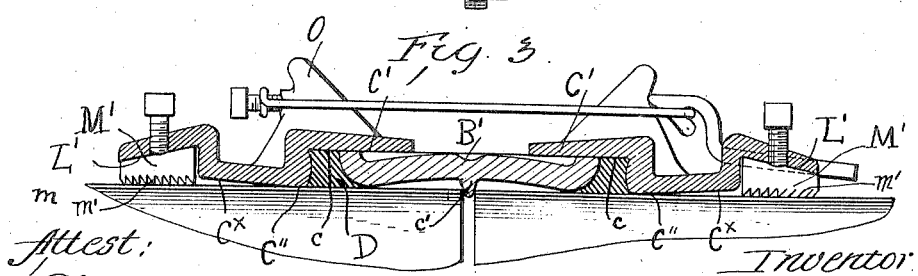

UNITED STATES PATENT OFFICE.

ORLANDO E. DAVID, OF BRADFORD, PENNSYLVANIA.

PIPE-COUPLING.

No. 817,300.　　　　Specification of Letters Patent.　　　Patented April 10, 1906.

Application filed April 26, 1905. Serial No. 257,559.

*To all whom it may concern:*

Be it known that I, ORLANDO E. DAVID, a citizen of the United States, residing at Bradford, Pennsylvania, have invented certain new and useful Improvements in Pipe-Couplings, of which the following is a specification.

My invention relates to pipe-couplings. Experience has shown that in large pipe-lines coupled together without threads there is a great tendency to creep, and as a result many leaks are started in the lines. Threaded couplings are impractical for lines of this sort inasmuch as after they have been buried under the ground for any length of time the threads become so rusted that it is exceedingly difficult to separate the pipes when it is necessary to replace them.

The object of my invention is to produce a pipe-coupling which will prevent the pipes creeping in the couplings and one which may be easily disconnected.

With these objects in view my invention consists in the construction hereinafter described, and more particularly pointed out in the claims.

Referring to the accompanying drawings, Figure 1 is a longitudinal section of the coupling applied to the pipes. Fig. 2 is an end view. Fig. 3 is a longitudinal section of a modified form of the coupling.

In the drawings, A A indicate the adjacent ends of two pipes. Surrounding the abutting ends of these pipes is a thimble B, which overlaps the end of each pipe and fits snugly around the same. Secured near the end of each pipe is a collar or sleeve C, which is provided with an internal annular recess c of sufficient depth to receive the thimble B. In the rear end of each sleeve is a series of recesses L, in each of which is loosely mounted a jaw M, having a toothed or serrated face m, which engages the surface of the pipe A and is pressed firmly against the same by the set-screw N, which extends through the sleeve C and engages the back of the jaw M.

Modified forms of the thimble B and sleeve C are shown in Fig. 3. In this form of the device the thimble B' has its internal surface slightly concaved and is provided with a centrally-arranged and inwardly-extending projection c', against which the ends of the pipe strike to insure the placing of the coupling centrally over the joint. The recesses L' in the sleeve C' are formed with their upper surfaces beveled, so that the depth of the recess is reduced at the outer end thereof. The jaws M' are also formed with a beveled upper surface to fit in the recess L'. The teeth m' of the jaw are pressed firmly into engagement with the pipe, and any creeping of the same in the sleeve will carry the beveled face of the jaw against the oppositely-beveled face of the recess and serve to press the jaw more firmly against the pipe, effectually stopping the creeping. That portion of the sleeve C' which lies between the recess L' and the recess c is flared outwardly at $C^\times$, so that it comes in contact with the pipe only at C''. Thus it will be seen that the sleeve C', taken in connection with the adjacent half of the concaved thimble B', forms practically a tubular sleeve having its opposite ends flared to permit the pipe to adjust itself to any irregularities in the surface of the ground.

A packing-ring D of any suitable material is placed between the end of the thimble B, the walls of the recess c, and the pipe, which give good packing-surfaces on four sides, against which the packing-ring is compressed.

Secured to or formed integral with the sleeve C at intervals around its outer circumference is a series of lugs or projections O, each having in its rear face one or more recesses o, adapted to receive the ends of the connecting-link H. This link is preferably formed of a single rod bent into substantially a U shape and having its free ends connected by the plate h, which carries the set-screw h' for adjusting the length of the link to bring the proper pressure to bear on the lugs O when the lever E is depressed. On the opposite end of the link is secured a lever E, having a cam-shaped bearing-face e, adapted to engage the face of the lug O.

The manner of connecting the pipes will be readily understood from the foregoing description, and it will be seen that the coupling is one in which there can be no creeping of the pipes, because of the toothed jaws M, which bite into the pipe and hold the sleeve C against any movement whatever. The link H is made adjustable in order to take up any slack in the coupling, and the operating-lever E is not liable to be so corroded or clogged as to prevent it from being easily operated.

Having described my invention, what I claim is—

1. In a pipe-coupling, the combination with the pipes, the sleeves secured thereto and lugs carried by said sleeves, of a link a set-screw carried thereby and adapted to engage one of said lugs and a cam-shaped lever carried by said link and engaging the other of said lugs, substantially as described.

2. In a pipe-coupling, the combination with the pipes, the sleeves secured thereto and lugs carried by said sleeves, of a link engaging one of said lugs, a cam-shaped lever carried by said link and engaging the other lug and means for adjusting the length of said link, substantially as described.

3. A pipe-coupling comprising the sleeves, the jaws carried thereby, the lugs on said sleeves, the thimble surrounding the ends of the pipes and in contact therewith, the link engaging said lugs and the cam-shaped lever carried by said link, substantially as described.

4. In a pipe-coupling, the combination with the pipes and the lugs carried by the abutting ends thereof, of a link adapted to engage said lugs, said link comprising a detachable U-shaped bar, locking means carried thereby and means distinct from said locking means for adjusting the length of the link, substantially as described.

5. In a pipe-coupling the combination with the pipes and the lugs carried by the abutting ends thereof, of a link adapted to engage said lugs, said link comprising a detachable U-shaped bar, a plate across the open end thereof, a set-screw carried by said plate for adjusting the length of said link and a cam-lever carried by said U-shaped bar, substantially as described.

6. In a pipe-coupling, the combination with the pipes, of the sleeves mounted thereon, said sleeves having tapered recesses therein, jaws carried in said recesses, and means for connecting said sleeves, substantially as described.

7. In a pipe-coupling, the combination with the pipes, of the sleeves mounted thereon, said sleeves having recesses therein of less depth at the outer end than at the inner end thereof, jaws carried in said recesses, said jaws having a beveled upper surface, and means for connecting said sleeves, substantially as described.

8. In a pipe-coupling, the combination of the pipes, the sleeves mounted thereon and having recesses in the opposite ends thereof, an outwardly-flaring portion between said recesses, and means for connecting said sleeves, substantially as described.

9. In a pipe-coupling, the combination with the pipes, the sleeves mounted thereon and having recesses in the opposite ends thereof, an inwardly-tapered portion between said recesses, of a thimble surrounding the ends of said pipes and entering the recesses in the inner ends of said sleeves, said thimble being tapered from the center toward the ends thereof, and means for connecting said sleeves, substantially as described.

In testimony whereof I affix my signature in presence of two witnesses.

ORLANDO E. DAVID.

Witnesses:
EDWIN E. TAIT,
KATHARINE T. BURKE.